(12) United States Patent
Vajapeyam et al.

(10) Patent No.: US 7,363,467 B2
(45) Date of Patent: Apr. 22, 2008

(54) DEPENDENCE-CHAIN PROCESSING USING TRACE DESCRIPTORS HAVING DEPENDENCY DESCRIPTORS

(75) Inventors: Sriram Vajapeyam, Kulai (IN); Bohuslav Rychlik, Santa Clara, CA (US); John P. Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 10/037,666

(22) Filed: Jan. 3, 2002

(65) Prior Publication Data
US 2003/0126408 A1 Jul. 3, 2003

(51) Int. Cl.
*G06F 9/30* (2006.01)
(52) U.S. Cl. .................... 712/216; 712/214
(58) Field of Classification Search ........ 712/205, 712/214, 216
See application file for complete search history.

(56) References Cited

U.S. PATENT DOCUMENTS

| | | | |
|---|---|---|---|
| 5,699,537 A | | 12/1997 | Sharangpani et al. |
| 5,732,255 A | * | 3/1998 | Verbauwhede .............. 712/248 |
| 6,018,798 A | * | 1/2000 | Witt et al. .................. 712/220 |
| 6,247,097 B1 | * | 6/2001 | Sinharoy ..................... 711/125 |
| 6,260,189 B1 | * | 7/2001 | Batten et al. ............... 717/151 |
| 6,304,962 B1 | * | 10/2001 | Nair ............................ 712/240 |
| 6,351,844 B1 | * | 2/2002 | Bala ........................... 717/128 |
| 6,427,204 B1 | * | 7/2002 | Arimilli et al. ............. 712/206 |
| 6,988,190 B1 | * | 1/2006 | Park ............................ 712/241 |
| 2002/0144098 A1 | | 10/2002 | Wang et al. |
| 2002/0144101 A1 | | 10/2002 | Wang et al. |

OTHER PUBLICATIONS

Sullery, "Beyond ILP II: SMT and Variants," May 2000, pp. 1-6.*
Rotenberg et al., "Trace Cache: A Low Latency Approach to High Bandwidth Instruction Fetching," 1996.*
Yuan Chou, John Shen, "Instruction Path Coprocessors", In Proceedings of 27th Annual International Symposium on Computer Architecture, pp. 270-281, Jun. 2000.
R. Iannucci, "Toward a Dataflow / von Neumann Hybrid Architecture", In Proceedings of 15th International Symposium on Computer Architecture, pp. 131-140, 1988.
S. Palacharla, James Smith, "Complexity-Effective Superscalar Processors", In 24th International Symposium on Computer Architecture, pp. 206-218, Denver, CO, Jun. 1997.
J.E. Smith, "Instruction-Level Distributed Processing," IEEE Computer, Apr. 2001.
Sriram Vajapeyam, Tulika Mitra, "Improving Superscalar Instruction Dispatch and Issue by Exploiting Dynamic Code Sequences," 7th International Symposium on Computer Architecture, India, Dec. 1997.

(Continued)

*Primary Examiner*—David J. Huisman
(74) *Attorney, Agent, or Firm*—Trop, Pruner & Hu, P.C.

(57) ABSTRACT

An apparatus and method for a processor microarchitecture that quickly and efficiently takes large steps through program segments without fetching all intervening instructions. The microarchitecture processes descriptors of trace sequences in program order so as to locate and dispatch descriptors of dependence chains that are used to fetch and execute the instructions of the dependence chain in data flow order.

16 Claims, 6 Drawing Sheets

OTHER PUBLICATIONS

Sanjay J. Patel, Steven S. Lumetta, "rePLay: A Hardware Framework for Dynamic program Optimization." Tech. Rep. CRHC-99-16, Center for Reliable High-Performance Computing, Univ. Illinois, Dec. 1999.

Narayan Ranganathan, Manoj Franklin, "An Empirical Study of Decentralized ILP Execution Models," In 8th International Conference on Architectural Support for Programmming Languages and Operation Systems, pp. 271-281, Oct. 1998.

Narayan Ranganathan, Manoj Franklin, "The PEWs Microarchitecture: Reducing Complexity Through Data-Dependence Based Decentralization," Microprocessor and Microprocessing Systems, 1998.

Eric Rotenberg, Steve Bennett, James E. Smith, "A Trace Cache Microarchitecture and Evaluation", IEEE Transactions on Computers, 48(2): 111-120 (1998).

Eric Rotenberg, "Trace Processors: Exploiting Hierarchy and Speculation". Ph.D. Thesis, Computer Sciences Dept. Univ. of Wisconsin—Madison (1996).

Sanjay J. Patel, Tony Tung, Satarupa Boe, Matthew M. Crum, "Increasing the Size of Atomic Instruction Blocks Using Control Flow Assertions," Proceedings of 33rd Annual International Symposium on Micro/Architecture, 2000.

Amir Roth, Guri Sohi, "Speculative Data-Driven Sequencing for imperative Programs," UW-Madison TechReport, Mar. 2000.

J.E. Smith, "Instruction-Level Distributed Processing," Proc. Int'l. Symp. on High-Performance Computing, Dec. 2000.

International Search Report for International Application No. PCT/US02/41551, mailed Apr. 23, 2003 (2 pages).

Friendly, Daniel Holmes, et al., "Putting the Fill Unit toWork: Dynamic Optimizations for Trace Cache Microprocessors", Proceedings of the 31st Annual ACM/IEEE International Symposium on Microarchitecture, pp. 173-181 (Nov. 30, 1998).

Patel, Sanjay J., et al., "rePLay: A Hardware Framework for Dynamic Optimization", IEEE Transactions On Computers, vol. 50, No. 6, pp. 590-608 (Jun. 2001).

Rotenberg, Eric, et al., "Trace Processors", Proceedings of the 30th Annual IEEE/ACM International Symposium on Microarchitecture, pp. 138-148 (Dec. 1, 1997).

Vajapeyam, Sriram, et al., "Improving Superscalar Instruction Dispatch and Issue by Exploiting Dynamic Code Sequences", Proceedings of the 24th Annual International Symposium on Computer Architecture, pp. 1-12 (Jun. 2, 1997).

Black, Bryan, et al., "The Block-based Trace Cache", Proceedings of the 26th International Symposium on Computer Architecture, pp. 196-207 (May 2-4, 1999).

Smith, James E., et al., "Trace Processors: Moving to Fourth-Generation Microarchitectures", Computer, vol. 30, Issue 9, pp. 68-74 (Sep. 1997).

Vajapeyam, Sriram, et al., "Dynamic Vectorization: A Mechanism for Exploiting Far-Flung ILP in Ordinary Programs", Proceedings of the 26th International Symposium on Computer Architecture, pp. 16-27 (May 2-4, 1999).

U.S. Appl. No. 10/950,693, entitled System, Method and Apparatus for Dependency Chain Processing, filed Sep. 28, 2004, by Satish Narayanasamy et al.

* cited by examiner

```
Trace
I00,  aw      r3, 0(r6)
I01,  addiu   r6, r6, 4
I02,  addiu   r7, r7, 1
I03,  alti    r2, r7, 32
I04,  bne     r2, r0, 0x42b3a8
I05,  lw      r5, 0(r6)
I06,  addu    r3, r0, r0
I07,  altu    r2, r5, r4
I08,  bne     r2, r0, 0x42b3d0
I09,  sw      r3, 0(r6)
I10,  addiu   r6, r6, 4
I11,  addiu   r7, r7, 1
I12,  slti    r2, r7, 32
I13,  bne     r2, r0, 0x42b3a8
```

DEPENDENCE-CHAIN PROCESSING USING TRACE DESCRIPTORS HAVING DEPENDENCY DESCRIPTORS

BACKGROUND OF THE INVENTION

1. Field of the Invention

This invention relates to the field of microprocessing, more specifically the present invention relates to an apparatus and method for executing microprocessor instructions grouped in dependency chains.

2. Description of the Related Art

Most current processors belong to a category of processors called superscalar processors. This category is further divided into RISC (Reduced Instruction Set Computer) or CISC (Complex Instructions Set Computer) processors. These processors are comprised of multiple internal processing units with circuitry for dispatching multiple instructions to these processing units. Superscalar processors fetch a sequence of instructions in program order. In this architecture, each instruction is a single operation. The dispatching circuitry of superscalar processors allows the execution of multiple instructions in a single processor cycle using a queue of instructions, also referred to as a pipeline.

This architecture also includes circuitry that searches within the pipeline for instructions capable of being executed at the same time. Widening the pipeline makes it possible to execute a greater number of instructions per cycle. However, there is no guaranty that any given sequence of instructions can take advantage of this capability. Instructions are not independent of one another but are inter-related. These inter-relationships prevent some instructions from being executed until other instructions have been executed, thus, preventing the use of the full capabilities of the processor to execute multiple instructions simultaneously.

Very Long Instructions Word (VLIW) processors constitute another category of processors where each instruction allows execution of multiple operations. Each operation from an instruction corresponds to an internal processing unit. VLIW processors are simpler than superscalar processors in that the dispatching of operations to multiple execution units is accomplished at the instruction level. Because a single VLIW instruction can specify multiple operations, the VLIW processors are capable of reducing the number of instructions required for a program. However, in order for the VLIW processor to sustain an average number of cycles per instruction comparable to the rate of a superscalar processor, the operations specified by VLIW instruction must be independent from one another. Otherwise, the VLIW instruction is similar to a sequential multiple operation CISC instruction and the number of cycles per instruction goes up accordingly. The instruction set or length of the VLIW processor is normally quite large taking many bits to encode multiple operations.

VLIW processors rely on software to pack the collection of operations representing a program into instructions. To do this, software uses a technique called compaction. Densely compacting operations into an instruction improves performance and encoding efficiency. During compaction, null operations are used in instructions where other operations cannot be used. Compaction serves as a limited form of out-of-order issue because operations are placed into instructions in many different orders. To compact the instructions, software must be able to detect independent operations and this can restrict the processor architecture, the application or both.

Both superscalar and VLIW processors make use of the concept referred to as instruction level parallelism (ILP). ILP architectures allow parallel computation of the lowest level machine operations such as memory loads, stores, integer additions and floating point multiplications within a single instruction cycle. ILP architectures contain multiple functional units and/or pipelined functional units but have a single program counter and operate on a single instruction stream. For ILP architectures effective hardware usage requires that the single instruction stream be ordered such that whenever possible, multiple low level operations can be in execution simultaneously. High performance microprocessors of both categories have focused on exploiting ILP and thus independent space representations of instruction groups. Pipelined and superscalar processors use hardware to check for independence of an instruction with all previous in-flight instructions prior to issuing an instruction for execution. These processors can execute instructions out-of-order in their search for ILP. A dependent instruction does not block the execution of subsequent independent instructions. In VLIW processors on the other hand, the compiler is relied upon to identify groups of independent operations, execute the operations of a group in parallel and execute different operation groups in program order.

Trace processors are a third type of processor which make use of short dynamic instruction sequences called traces. Trace processors improve upon superscalar processors by recording the instruction dependencies detected within a trace upon first visit of the trace and reuse this information on subsequent visits to the trace rather than recomputing the dependencies. A trace can be dynamically rescheduled to optimize ILP within the trace. However, limited ILP is exploited within a trace and multiple traces need to execute in parallel to exploit more ILP. Traces are likely to have multiple dependency links between them requiring inter-trace communication and forcing serialization between traces.

It is difficult to further scale most current superscalar techniques to get significantly more ILP. Small increases of ILP can require inordinate hardware complexity. There are still significant amounts of "far flung ILP" to be harvested. Thus, there is a need to develop complexity efficient microarchitecture implementations to harvest this far-flung ILP.

BRIEF DESCRIPTION OF THE DRAWINGS

Additional advantages of the invention will become apparent upon reading the following detailed description and upon reference to the drawings in which.

DETAILED DESCRIPTION

Exemplary embodiments are described with reference to specific configurations. Those of ordinary skill in the art will appreciate the various changes and modifications to be made while remaining within the scope of the appended claims. Additionally, well known elements, devices, components, circuits, process steps and the like are not set forth in detail in order to avoid obscuring the present invention.

The present invention involves recasting a program into dependence chains. Dependence chains and information about them are recorded in a storage device. The present invention processes this recorded information in the dependence chains.

The dependence chain information is formed by partitioning the dynamic program stream into traces according to a maximum trace size and control flow boundaries. Then each trace is further partitioned into completely independent dependence chains along data flow boundaries. One skilled in the art would appreciate that this invention could also be implemented using frames or any other type of dynamic instruction sequence in the place of a trace.

Dependence chains are defined to be the fully connected components of the trace data flow graph. An instruction is assigned to a dependence chain if it has either a producer or consumer instruction in that dependence chain. A producer instruction generates a result or side-effect on which the present instructions depends. A consumer instruction depends on the result or side effect of the present instruction. The instructions in a dependence chain can be non-contiguous in a trace. A dependence chain may contain forks when a producer has multiple consumers, as well as joins when a consumer has multiple producers. Note, that a dependence chain in this case therefore actually means dependence graph. However, the word "chain" has replaced the term "graph" to better convey the focus of the use of the data structure and this is a term commonly used in the field.

Figures 3, 4:
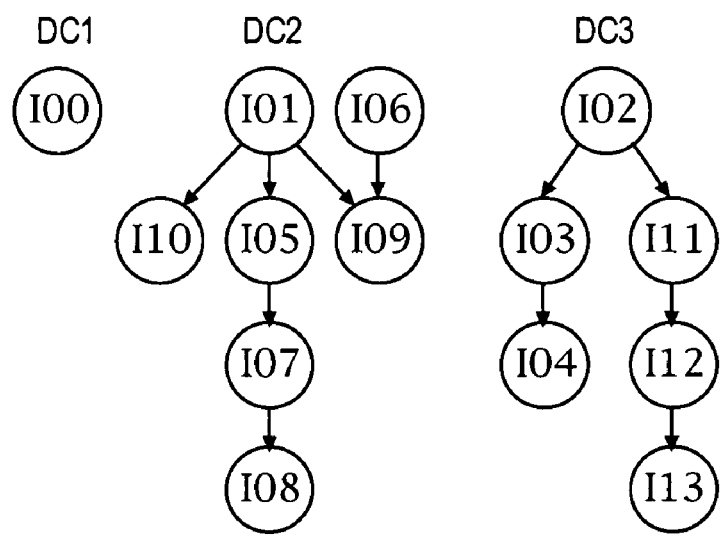
FIG. 3 depicts an example trace.
FIG. 4 depicts the trace of FIG. 3 represented as a dependence chain graph.

FIG. 3 shows a sample trace using the instruction set of the MIPS™ Processor, available from MIPS Technologies, Inc., for exemplary purposes. FIG. 4 shows the trace of FIG. 3 represented as constituent dependence chains. Each circle in the dependence chain diagram is equivalent to an instruction from the trace. Thus, the circle in dependence chain 1 labeled I00 in FIG. 4 corresponds to instruction 00 in FIG. 3 which is a store word operation. No subsequent instruction depends upon instruction I00 because the contents of register 3 are not affected nor does any subsequent instruction require the contents of the memory location pointed to as the destination of the instruction.

Dependence chain 2 in FIG. 4 demonstrates that instructions I10, I05 and I09 all depend on instruction I01. Instruction I10 adds the integer 4 to the contents of register R6, however the outcome of this addition is dependent upon the addition that takes place in instruction I01. Instruction I05 depends on I01 because it loads into register R5 the contents of the memory location pointed to by register R6 which had been altered by instruction I01. Likewise, instruction I09 seeks to store the contents of register R3 in the memory location pointed to by register R6, thus it depends upon the outcome of instruction I01.

Figure 1:
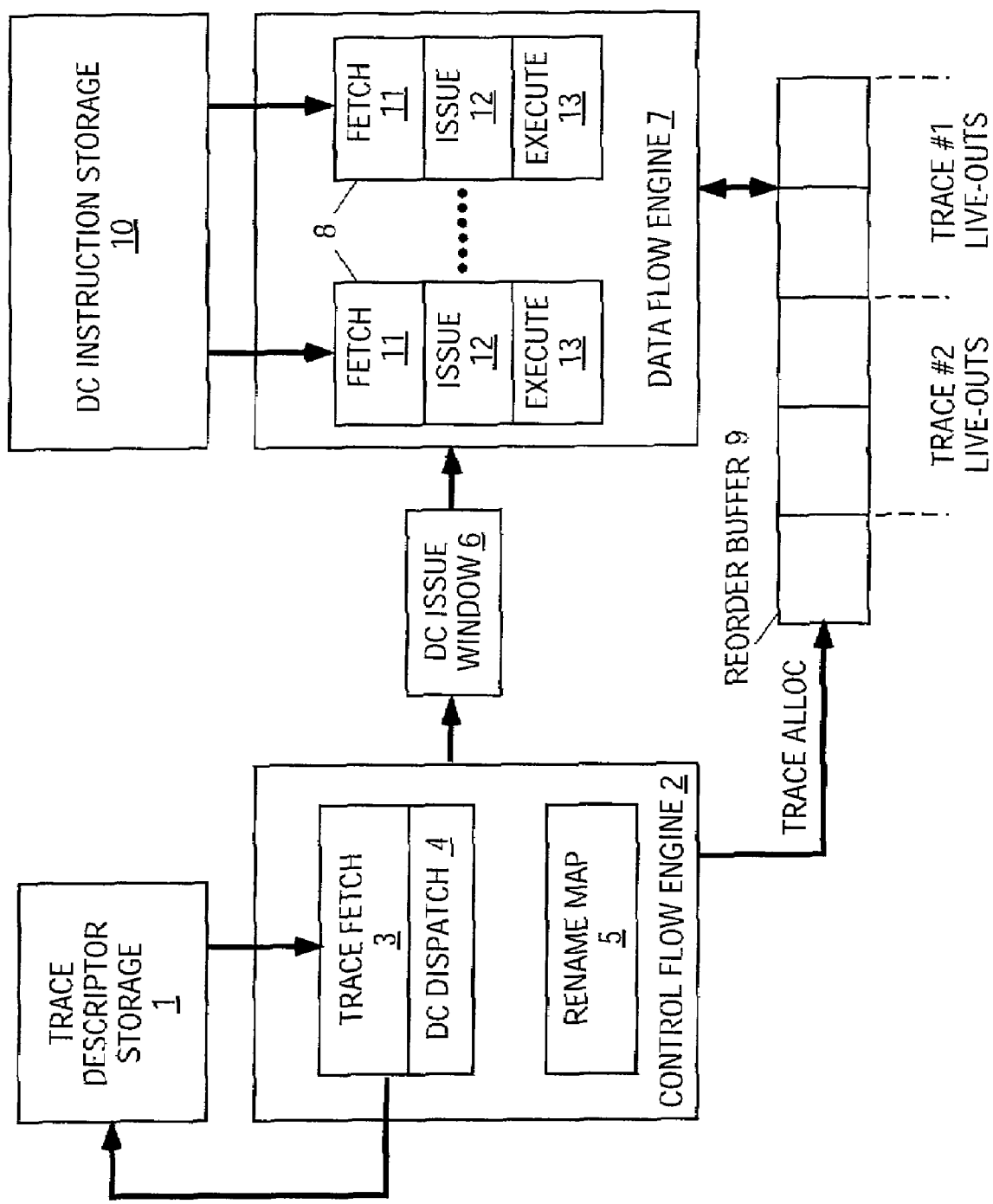
FIG. 1 depicts the dependence chain processor.
Figure 2:
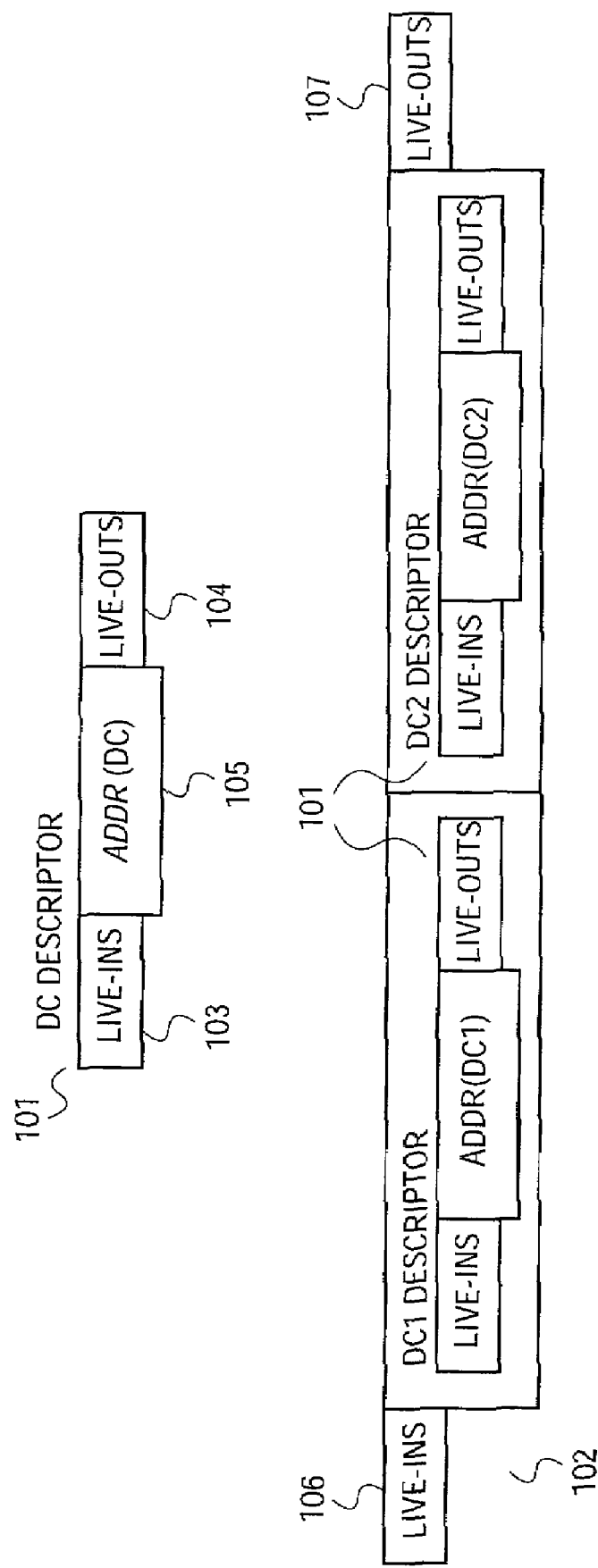
FIG. 2 depicts the trace descriptors and DC (dependency chain) descriptors.

The dependency chains are laid out in dependence order in memory or in specialized caches such as the dependence chain instruction storage 10 in FIG. 1. Information packets called "descriptors" are generated for dependency chains and traces. FIG. 2 illustrates the dependency chain and trace descriptor formats. A dependency descriptor 101 contains the address of the dependency chain 105 in the dependency chain instruction storage 10 instead of the actual instructions and, therefore, suffices to represent the entire dependency chain. Dependency chain descriptors 101 may also contain information about the about the live-in 103 and live-outs 104 of the dependency chain. The live-ins are the data upon which the dependency chain or trace depend for their execution as a whole. The live-outs are the data which the dependency chain alters and other dependency chains may be depended upon. A trace descriptor 102 as illustrated in FIG. 2 represents a trace. A trace descriptor holds dependency chain descriptors plus overall live-in 106 and live-out 107 information for the entire trace. The trace descriptors 102 are stored in a specialized cache or memory such as the trace descriptor storage 1 in FIG. 1. In another embodiment trace descriptors are stored in both a specialized cache and a general memory device.

Dependency chains can be constructed transparently and efficiently at run time by hardware or runtime software microcode or combination thereof. A compiler can also construct dependency chains by exploiting profile data or a static control flow speculation. Dependency chains typically span multiple basic blocks and can span multiple traces or even multiple frames. They can be stored in user addressable memory for compiler constructed dependency chains or a reserved portion of the program address base that is not directly accessible to the user programmer. The physical implementation of this memory can be optimized for a dependency chain fetch. Possible optimizations include multi-banking, multi-arraying or specialized dependency chain cache structures.

FIG. 1 illustrates one embodiment of the present invention, where the dependency chain processor consists of a control flow engine 2 and a data flow engine 7 that cooperate in producer/consumer fashion to execute programs. A control flow engine 2 reads and processes trace descriptors from the trace descriptor storage in speculative control flow order. Speculative fetching of trace descriptors is carried out by a trace fetch unit 3. Each trace descriptor 102 contains dependency chain descriptors 101 for the trace's constituent dependency chains, in addition to aggregate trace information. Upon processing by the DC (dependency chain) dispatch unit 4 of a trace descriptor, the control flow engine 2 pushes the constituent dependency chain descriptors 101 into a dependency chain issue window 6. A data flow engine 1 in turn consumes dependency chain descriptors 101 from the dependency chain issue window 6 dispatching them to available clusters 8 for execution within each execution cluster 8 instructions of the assigned dependency chain are fetched from the dependency chain instruction storage and executed. Each execution cluster 8 may include a fetch unit 11, issue unit 12 and execute unit 13.

The control flow engine 2 is responsible for in order execution semantics. The trace live-in register names stored in each trace descriptor 102 are looked up in a global rename map 5 and translated to entry tags in a global reorder buffer 9. The global register tags are recorded in a dependency chain descriptor 101. Only trace live-in values are dynamically renamed not all instruction sources. The control flow engine 2 also allocates entries for the trace live-out results in the global reorder buffer 9. Only trace live-outs are allocated space on the reorder buffer 9 not other types of instruction results. The allocated entry tags are recorded in the dependency chain descriptors 101.

The control flow engine fetches 2 trace descriptors 102 in program order and processes them. For each trace the control flow engine 2 allocates sufficient space in a reorder buffer 9, renames live-in and live-out values to reorder buffer entries for its dependency chains and dispatches dependency chain descriptors 101 for execution to the dependency chain issue window 6. The reorder buffer 9 is similar to a global rename register pool unified with a typical reorder buffer such as Pentium Pro™ ROB, available from Intel Corporation, except that only the live-outs for the dependency chains are stored not individual instruction results.

The data flow engine 7 is responsible for out-of-order fetch and execution of instructions. It consumes dependency chain descriptors 101 from the dependency chain issue window 6 and assigns them to available execution clusters 8. The dependency chain address 105 stored in each dependency chain descriptor 101 is used by each cluster 8 to start sequentially fetching and executing the instructions of the dependency chain. A data flow engine has multiple execution clusters 8 to allow simultaneous execution of many dependency chains and obtain high ILP. The instructions within the dependency chain are dependence ordered, out of program order and all intra-dependency chain dependencies are statically prerenamed to a mini register file local to each cluster 8. Dependency chain live-in sources and live out results are statically preassigned to local registers remapping entries which are configured to point to the global register file tags when the dependency chain is assigned to the cluster 8.

Instructions within each cluster may stall on previous instruction execution or on live-in availability. Only dependency chain live-out results are broadcast globally to the other clusters 8 and the global reorder buffer 9. In another embodiment, the clusters are pipelined and contain first-in first-out (FIFO) stream buffers to support instruction prefetch. The data flow engine 7 provides both static and dynamic out-of-order fetch and execution. Instructions within each dependency chain are statically data flow preordered. Dependency chains in different clusters 8 can dynamically stall or resume independently of each other. Independent dependency chain execution is further enhanced by guarantying there are no data dependencies between dependency chains of the same trace. However, dependency chains may stall to satisfy live-ins produced by a previous trace.

Figure 5:
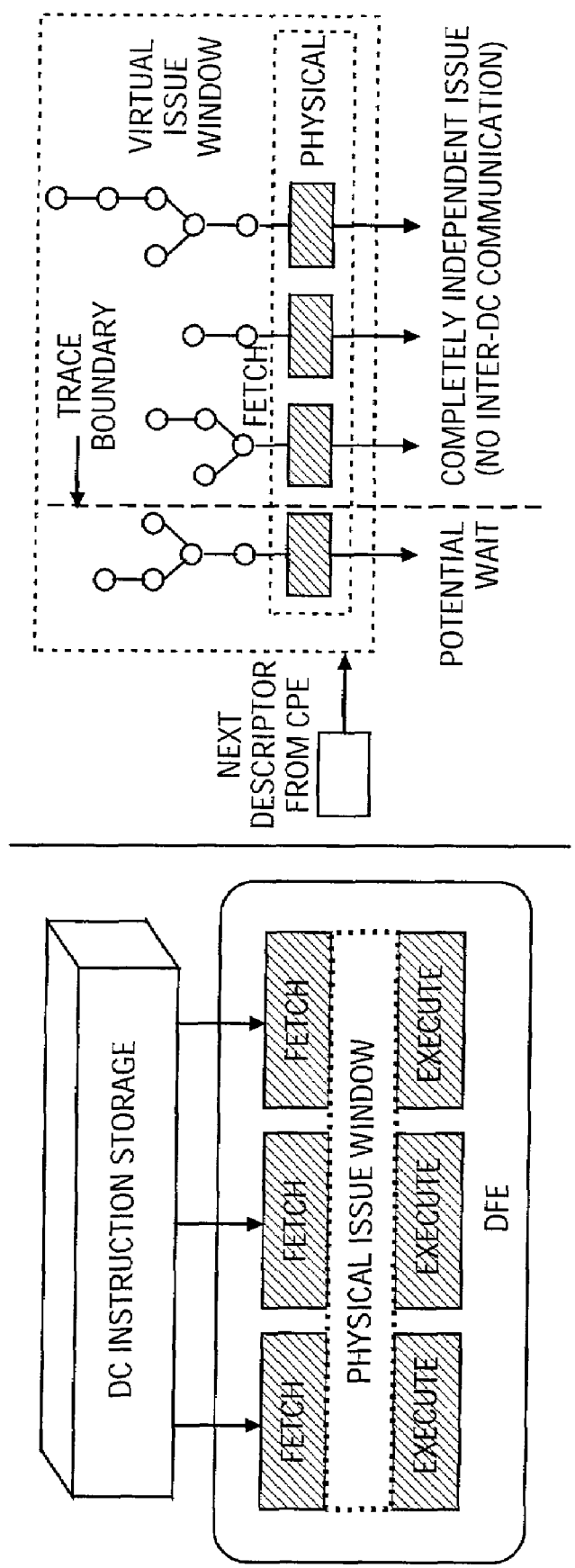
FIG. 5 depicts a virtual issue window and actual physical window.

Overall, instruction fetch is a two-stage process. The fetch of traces descriptors 102 in program order is the first stage. The fetch of actual instructions of a dependency chain in dependence order is the second stage. This has two main benefits. First, the fetch and processing of trace descriptors 102 in the control flow engine 2 may allow it to step ahead faster in the dynamic instruction stream, because the trace descriptors 102 occupy much less space than the instructions themselves and because only aggregate resources for traces such as global reorder buffer 9 live-out entries are allocated by the control flow engine 2. This run ahead stepping through trace descriptors 102 and dispatching of dependency chain descriptors 101 can create a large virtual issue window allowing the processor to get potentially distant yet ready to execute instructions quickly as illustrated in FIG. 5. Fast stepping through the trace descriptors 102 by the control flow engine 2 can also allow the virtual issue window to enjoy fast refill following branch mispredictions.

The second benefit of the two stage fetch system is that instructions are individually fetched just in time for execution and hence do not require the typical storage and state tracking in the machine in a large physical issue window. Only currently executing instructions and live-out results need to be tracked. Therefore, minimal hardware cost is spent on maintaining the bulk of the instructions in the virtual issue window.

Execution of dependency chain instructions behaves almost exactly as in a traditional processor. It updates appropriate reorder buffer 9 entries if its output is live-out from the dependency chain or else it simply updates the local registers. In addition, the issue execution of an instruction triggers just in time fetch of the next instruction of the dependency chain. The dependency chain issue window 6 serves the function of the traditional instruction window. It holds descriptors for all dependency chains that are waiting for either registers or memory values. Just as in a superscalar processor, where instructions are issued out-of-order from an instruction issue window to functional units. In a dependency chain processor, dependency chains are issued out-of-order from a dependency chain issue window 6 to execution units. However, each entry in the dependency chain issue window 6 holds a dependency chain descriptor 101 rather than the dependency chain instructions. When an active dependency chain writes a live-out register or completes a store, the corresponding information is broadcast through the dependency chain issue window 6.

In effect, the control flow engine 2 maintains Von Neuman machine architecture style execution semantics without actually fetching the instructions themselves while the data flow engine fetches and executes instructions of a trace out of program order resembling a data flow machine. Furthermore, intra-dependency chain instruction result communications, the bulk of most communications, are contained within each execution cluster. Only the results that are live-out from each dependency chain need to be broadcast globally to other clusters 8 and the global reorder buffer 9. Exceptions are handled similar to the manner in which they are handled in a frame processor. A trace is treated as a checkpoint interval for the global rename map 5 and reorder buffer 9. When an exception occurs within a trace, the processors state is restored to the start of the trace checkpoint (trace boundary) and subsequent instructions are replayed sequentially in program order until the faulting instruction is reached.

Under normal circumstances, the control flow engine 2 and the data flow engine 7 have a simple producer consumer relationship through the dependency chain issue window 6. Typically, if all instructions in a trace execute with no exceptions or mispredictions, the entire trace can be committed by freeing its reorder buffer entry as in copying their values to architected state. However, branch mispredictions and exceptions present special cases where the data flow engine 7 can effect the control flow engine 2.

The architecture state consists of the most recently completed and pending assignments to each register, relative to the end of the known instruction sequence, regardless of which instructions have been issued or completed. This is the state that must be accessed by an instruction following this sequence, for correct operation.

Branches internal to a trace can be converted to control flow assertions. When a branch is mispredicted, its assertion will fire causing processor state to be restored to the start of a trace checkpoint. Normal trace descriptor fetch can then resume with the correct path trace descriptors available. Memory dependencies can be handled speculatively via dependence prediction both statically during dependency chain formation and dynamically to establish inter-dependency chain dependencies. Memory dependence store to load misprediction requires replaying the effected dependency chain suppressing internal store to load forwarding for the mispredicted load to ensure it gets the correct data. Subsequent traces may then be replayed either completely or partially. Other data related misspeculations as well as sophisticated control independence techniques can be handled similarly.

Memory dependencies can be handled as in traditional processors via a memory dependence speculation table. If a dependency chain is predicted to depend on a previously dispatched dependency chain, it is suitably tagged and dispatched to a dependency chain issue window 6. The tag enables it to monitor block pool broadcast for the completion of its ancestor dependency chain.

In a dependency chain processor, the register rename bandwidth is reduced in comparison to superscalar processors because only trace live-ins need to be looked up dynamically in the global rename map 5. Furthermore, the intra-dispatch group dependence check is eliminated because these become statically established intra dependency chain dependencies. Scheduling is greatly simplified in a dependency chain processor because only the few instructions in the heads of the active dependency chains are eligible for wake up and select. Instead of quadratic complexity, scheduling becomes trivial as each cluster potentially wakes up and selects a single instruction. Simultaneously, the flexibility of a dynamic out-of-order scheduler is maintained by organizing instructions in new dependency chains and executing these in independently stalling clusters. Additionally, for a given front end bandwidth, stepping through compact descriptors rather than fetching instructions can allow faster refill of the virtual issue window following branch mispredictions.

Global result communication is reduced by globally broadcasting only trace live-out results and by using dependency chains for cluster 8 assignments. Dependency chains from the same trace executing simultaneously are guaranteed to require zero communication between each other.

Instruction state tracking is minimized not only by allocating only live-out entries in the rename registers 5 and reorder buffer 9 but also by using descriptors almost to the time of actual execution and then performing only just-in-time fetch and decode. With just-in-time fetch, the amount of instruction state that must be maintained becomes a function of the issue width, rather than the much larger issue window. The physical issue window does not need to hold and track the many instructions waiting for operands.

Live-outs from a dependency chain can be grouped together in the reorder buffer 9 or be interleaved with live-outs from other dependency chains in the same trace descriptor. However, live-outs from different traces are not interleaved. This allows architected state recovery at trace check points in the case of branch mispredictions. After the reorder buffer 9 entries are allocated, a global register rename map 5 is updated with the new location of the live-out registers. Dependency chains from subsequent trace descriptors 102 use the rename map 5 to obtain tags for the latest version of their live-in values. The old mapping is checkpointed to allow branch misprediction recovery. After fetching a trace descriptor 102 the control flow engine 2 can use a next-trace-predictor. The trace fetching and processing steps of the control flow engine 2 can be pipelined as needed.

The data flow engine 7 is coupled to the dependency chain issue window 6 from which issue ready dependency chains to execution clusters 8. Each execution cluster 8 has a simple instruction queue, a pool of execution units and a local register file. Instructions are fetched into the instruction queue and issued to the local execution unit in order satisfying data flow constraints. The instruction queue can be an instruction stream buffer that fetches the instructions of its dependency chain just-in-time based on data flow constraints from the dependency chain instruction storage 10. A local register file is used to handle intra-dependency chain register communication.

The dependency chain issue window 6 can be subdivided into inactive and active regions. The inactive region buffers and decouples the control flow engine 2 from the data flow engine 7. Live-out results from the execution clusters 8 do not need to be broadcast to the inactive region. Each dependency chain remains in the active portion of the issue window 6 until all of its instructions are executed in its assigned cluster 8.

Other embodiments of the dependency issue window 6 include an implementation where each blocked dependency chain waits in the dependency chain issue window 6 until all of its live-ins become available. Each blocked dependency chain has a single entry in the dependency chain issue window 6 with entry width equal to its count of live-ins.

In this embodiment dependency chains are removed from the issue window 6 immediately upon assignment to an execution cluster. The dependency chains then do not need to listen for live-in results when the cluster because they waited to receive all necessary live-ins before being assigned to an execution cluster 8. The dependence chain that has all its live-ins ready in memory and dependencies cleared is issued to an execution cluster. The advantage of this implementation is that only dependence chains that are completely ready to execute are allocated to execution clusters. The disadvantage is that a dependency chain does not begin executing until all of its live-ins are ready.

In another embodiment, a cluster is allocated for a dependency chain as soon as the live-ins for the first instruction become available. The instruction within a dependency chain can then continue to execute as long as any additional required live-ins are ready. Dependency chain execution can be stalled midway to wait for another required live-in as needed. In this embodiment only the dependence chains that have been assigned to an execution cluster 8 are in the active region of the issue window 6. Other dependence chains remain in the inactive region of the issue window 6 as they do not need to listen for live-out results from execution clusters 8 (which may be live-ins to dependence chains in the active region). The advantage is that a dependency chain can begin execution sooner before all the live-ins are available. The disadvantage is a dependency-chain stalled midway still occupies an execution cluster 8 because of the local values stored in the local register file.

In both of these embodiments, dispatch is logically decomposed into two components. Dispatch of dependency chains to clusters and dispatch of instructions within a dependency chain to functional units within the cluster.

In another embodiment of the present invention, an enhancement would allow a dependency chain to be chained to a previously chained dependency chain. This would allow a long chain to be built for multiple dependency chains wherever necessary. To enable such multi-level chaining, a dependency chain map would be appropriately maintained such that registers and memory locations produced by a chain dependency chain mapped back to the ancestor dependency chain of the chain's dependency chain. This allows a dependency chain to quickly locate the root of its ancestors.

In another embodiment of the present invention, the dependency chain issue window 6 could use an additional direct map table to enable dependency chain chaining. This table holds as a block dependency chains that are dependent on a single active dependency chain rather than on multiple dependency chains and as indexed within a dependency chain ID of an active dependency chain. When an active dependency chain completes a chaining table is looked up in direct map fashion to a trigger dependent dependency chain in addition to broadcasting the dependency chain result over the rest of the dependency window. The cost of result broadcast and associative of match over a large window can be further reduced. This table would be especially useful for its memory dependencies if each dependency chain has a single memory reference. Further, the direct map table can simplify just-in-time movement of blocked dependency chains to execution clusters 8 since it directly links dependent dependency chains rather than linking them through intermediate storage. Implementation of chaining would require the presence of tables that map registers and memory dependencies back to the producer dependency chain referred to collectively as a dependency chain map. One way of implementing the above-mentioned table is to simply provide a field in a dependency chain entry in a dependency chain pool. The fields hold dependency chain descriptors of dependent dependency chains.

Other embodiments of the present invention replace the dependency chain issue window 6 with other structures suitable for managing the producer consumer relationship between the control flow engine 2 and the data flow engine 7 (e.g. a priority queue or stack). A further embodiment uses no intermediate structure between the control flow engine 2 and data flow engine 7. The control flow engine 2 produces based on the ability of data flow engine 7 to consume. This is accomplished by a control signal from the data flow engine that indicates its readiness to accept dependency descriptors.

Dependency chain instructions are fetched in just-in-time fashion from memory. Each dependency chain can be laid out sequentially in memory by the compiler or the runtime dependency chain constructor can judiciously position the dependency chains to maximize the advantage of a multiple bank memory system and minimize bank conflicts between concurrent dependency chains. Physical memory can be banked with each dependency chain resident in a single bank. The instructions of a dependency chain are fetched sequentially so it is not desirable to stripe dependency chain across multiple banks. Each data flow engine execution cluster 8 then accesses its bank with some of its dependency chain IDs for base address and dependency chain program counter since multiple dependency chains will be executing in parallel. The dependency chain IDs can be assigned so that they can be fetched in parallel from multiple banks.

The line width of a single memory bank allows multiple dependency chain instructions to be fetched to the execution cluster in a single parallel access. The line width of the memory bank can be reduced to one instruction word to enable multiple dependency chains to be fetched in parallel using limited memory bandwidth. Multiple lines of the dependency chain are fetched in just-in-time fashion, when instruction completion time is known fetch of the subsequent instruction is initiated.

In another embodiment of the present invention, an instruction stream buffer can be added in front of each execution cluster 8. Because instructions within a dependency chain are fetched and executed serially, they can be cached in simple first-in first-out (FIFO) stream buffers to mask the effects of bank conflicts that might arise. Whenever execution of instructions within a dependency chain halt due to longer execution latency as for data cache misses a stream buffer fill can get ahead of execution. The stream buffer can also get ahead if the line is greater than one instruction.

Another form of the stream buffer enhancement could fill the stream buffers from a specialized dependency chain cache where dependency chains are stored. Each dependency chain cache entry line would hold an entire dependency chain. When a dependency chain is issued to an execution cluster, its entire dependency chain cache line could potentially be devoted into an empty stream buffer. Instead of being iteratively filled, the stream buffer could be modified to allow all its entries to be written in parallel in one cycle in FIFO design. This might limit dependency chain issue to one per cycle, but would eliminate the bank conflict problem.

Figure 6:
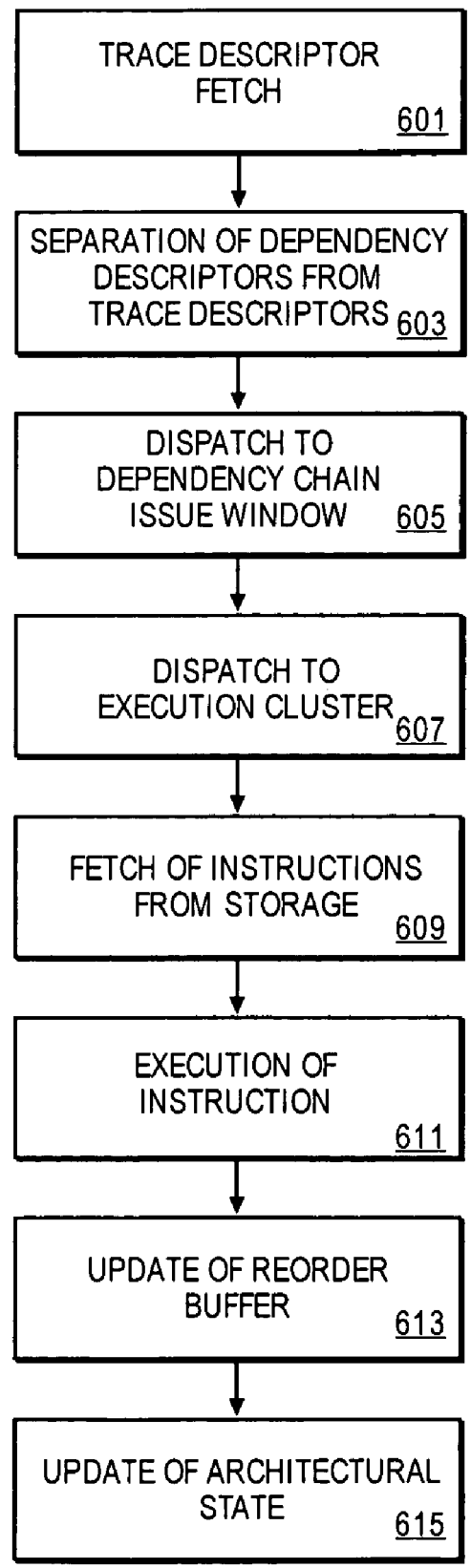
FIG. 6 is a flow chart depicting steps of processing data in the dependence chain processor.

FIG. 6 is a flowchart depicting one embodiment of processing data in the dependency chain processor. A trace description may be fetched (block 601). Dependency descriptors may be separated from the trace descriptors (block 603). Dependency descriptors may be dispatched to the dependency chain issue window (block 605). The descriptors may be dispatched to execution cluster (block 607). Instructions may be fetched from storage (block 609). The instructions may be executed (block 611). The reorder buffer may be updated (block 613). The architectural state may be updated (block 615).

Figure 7:
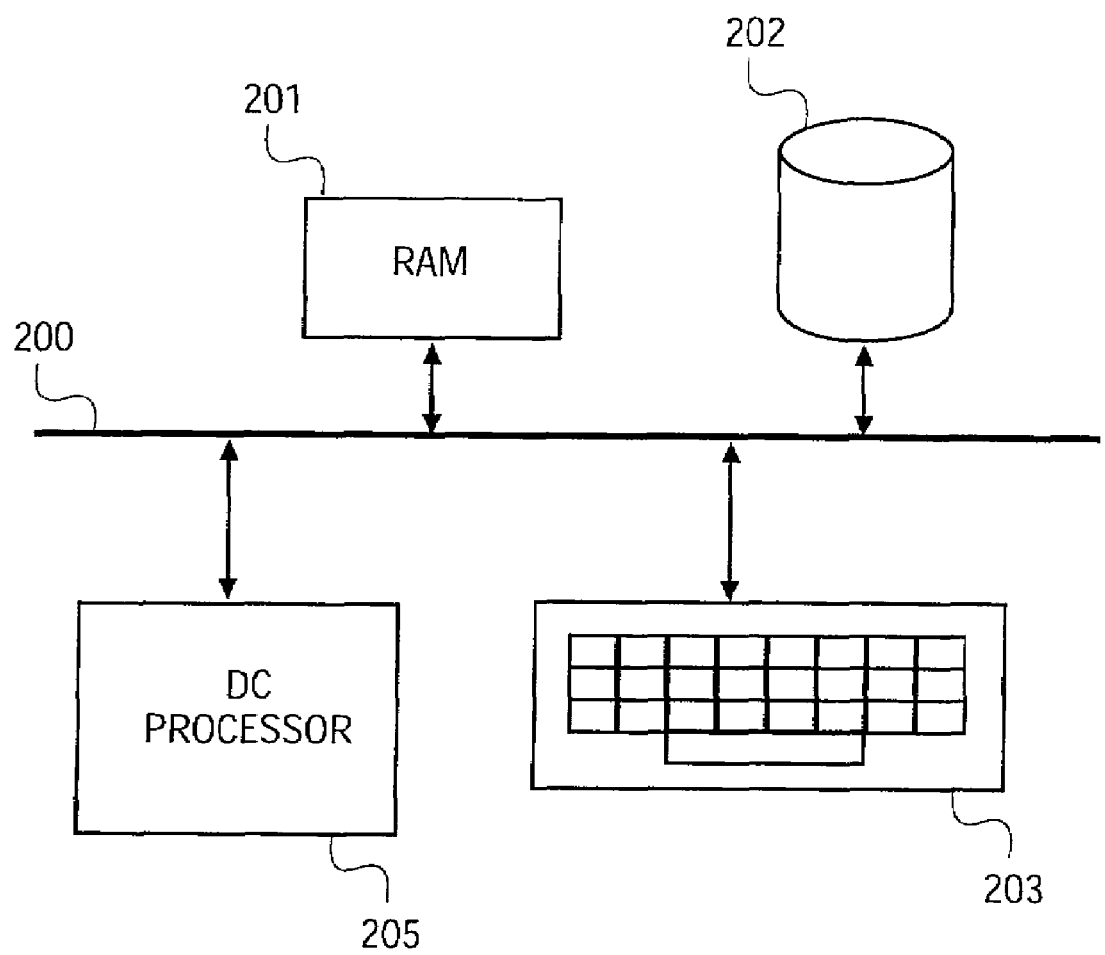
FIG. 7 depicts a dependency chain processor system.

Another embodiment of the present invention, illustrated in FIG. 7, is the use of the dependency chain processor 205 in a computer system with a bus 200 connecting the dependency chain processor 205 with a memory 201, storage unit 202 and other peripherals such as a keyboard 203.

Another embodiment would implement the dependency chain processor in software (e.g., microcode or higher level computer languages). The software implementation may also be used to run simulations or emulations of the dependency chain processor. A software implementation may be stored on a machine readable medium. A "machine readable" medium may include any medium that can store or transfer information. Examples of a machine readable medium include a ROM, a floppy diskette, a CD-ROM, an optical disk, a hard disk.

Having disclosed exemplary embodiments, modifications and variations may be made to do to the disclosed embodiments while remaining within the spirit and scope of the invention as defined by the appended claims.

What is claimed is:

1. A logic circuit comprising:
    data flow logic;
    control flow logic to select and fetch a trace descriptor for processing, the fetched trace descriptor including at least one dependency descriptor, the control flow logic to dispatch to the data flow logic a dependency descriptor including dependency information having live-in information and live-out information for an instruction sequence and an address of the instruction sequence;
    the data flow logic coupled to the control flow logic to receive the dispatched dependency descriptor, to fetch the instruction sequence using the address from the received dependency descriptor, and to execute the instruction sequence according to the dependency information in the received dependency descriptor; and
    an issue window coupled between the control flow logic and the data flow logic, the issue window to store the dependency descriptor dispatched from the control flow logic wherein the issue window includes a first portion to store active dependency descriptors and a second portion to store inactive dependency descriptors, wherein an inactive dependency descriptor is to remain in the second portion until data to be used by the corresponding instruction sequence is available.

2. The logic circuit of claim 1 comprising a storage area coupled to the control flow logic and the data flow logic, the storage area to store the dependency descriptor dispatched by the control flow logic.

3. The logic circuit of claim 1 comprising a storage area coupled to the control flow logic, the storage area to store a trace descriptors.

4. The logic circuit of claim 3 comprising a second storage area coupled to the data flow logic, the second storage area to store instructions contiguously based on dependency information.

5. The logic circuit of claim 1 comprising a storage area coupled to the data flow logic and control flow logic, the storage area to store live-out data.

6. The logic circuit of claim 1 comprising a storage area coupled to the control flow logic, the storage area to map dependency information.

7. The logic circuit of claim 1 wherein the fetched trace descriptor includes a plurality of dependency descriptors having addresses of corresponding instruction sequences and having dependency information for corresponding instruction sequences.

8. The logic circuit of claim 1 wherein the trace descriptor includes aggregate live-in information for a plurality of dependency descriptors in the trace descriptor.

9. The logic circuit of claim 1 wherein the trace descriptor includes aggregate live-out information for a plurality of dependency descriptors in the trace descriptor.

10. A computer system comprising:
at least one memory device to store trace descriptors and instruction sequences, each trace descriptor associated with a trace;
a bus coupled to the at least one memory device;
control flow logic to select and fetch one of the trace descriptors, the fetched trace descriptor including a plurality of dependency descriptors having locations of corresponding instruction sequences within the trace and having dependency information for the corresponding instruction sequences;
data flow logic coupled to the control flow logic to receive a dependency descriptor dispatched from the control flow logic, to fetch an instruction sequence corresponding to the received dependency descriptor, and to execute the fetched instruction sequence according to dependency information in the received dependency descriptor; and
an issue window coupled between the control flow logic and the data flow logic, the issue window to store the dependency descriptor dispatched from the control flow logic wherein the issue window includes a first portion to store active dependency descriptors and a second portion to store inactive dependency descriptors, wherein an inactive dependency descriptor is to remain in the second portion until data to be used by the corresponding instruction sequence is available.

11. The computer system of claim 10 wherein the at least one memory device is to store an instruction sequence contiguously based on dependency information.

12. The computer system of claim 10 comprising a storage area coupled to the data flow logic and control flow logic, the storage area to store live-out data.

13. The computer system of claim 10 comprising a storage area coupled to the control flow logic, the storage area to map dependency information.

14. The computer system of claim 10 wherein dependency information in the received dependency descriptor includes live-in and live-out information.

15. The computer system of claim 10, wherein the data flow logic includes a plurality of clusters each to independently execute different fetched instruction sequences each corresponding to a different received dependency descriptor.

16. The system of claim 10, wherein only results of the execution corresponding to the aggregate live-out information are to be globally broadcasted.

* * * * *